United States Patent [19]

Foley

[11] Patent Number: 4,957,803
[45] Date of Patent: Sep. 18, 1990

[54] WATER DEFLECTOR WITH WIRE HARNESS SEAL

[75] Inventor: Dennis D. Foley, Inverness, Fla.

[73] Assignee: The Excello Specialty Company, Cleveland, Ohio

[21] Appl. No.: 225,239

[22] Filed: Jul. 28, 1988

[51] Int. Cl.[5] .......................... B32B 3/28; B32B 3/30; B32B 31/18; B32B 31/20
[52] U.S. Cl. ..................................... 428/182; 428/144; 428/80; 428/120; 428/119; 156/293
[58] Field of Search ................. 428/80, 194, 182, 120, 428/119; 156/293

[56] References Cited

U.S. PATENT DOCUMENTS

| | | | |
|---|---|---|---|
| 3,770,556 | 11/1973 | Evans | 428/194 |
| 4,469,732 | 9/1984 | Isaksen et al. | 428/80 |
| 4,533,577 | 8/1985 | Mier | 428/194 |
| 4,588,627 | 5/1986 | Isaksen et al. | 428/80 |
| 4,696,848 | 9/1987 | Jones et al. | 428/182 |
| 4,803,777 | 2/1989 | Nakagawa | 156/293 |

FOREIGN PATENT DOCUMENTS 1465963  3/1977  United Kingdom ................ 156/293

Primary Examiner—Ellis P. Robinson
Assistant Examiner—William P. Watkins, III
Attorney, Agent, or Firm—Fay, Sharpe, Beall, Fagan, Minnich & McKee

[57] ABSTRACT

A water deflector or shield device particularly suited for use on the inner panel of a vehicle door comprises a water impervious thin, flexible plastic sheet having a peripheral configuration matching the peripheral configuration of a portion of the panel. The sheet is provided with a sealing arrangement to permit electrical wires or the like to pass through the sheet in sealed relationship thereto. The sealing arrangement includes a laterally extending pocket in the sheet at a predetermined point corresponding to the point through which it is desired to extend the wire. A hole is formed at the bottom of the pocket and the interior of the pocket has an adhesive therin. After the wire is passed through the hole, the interior of the pocket is sealingly adhered to the wire.

14 Claims, 2 Drawing Sheets

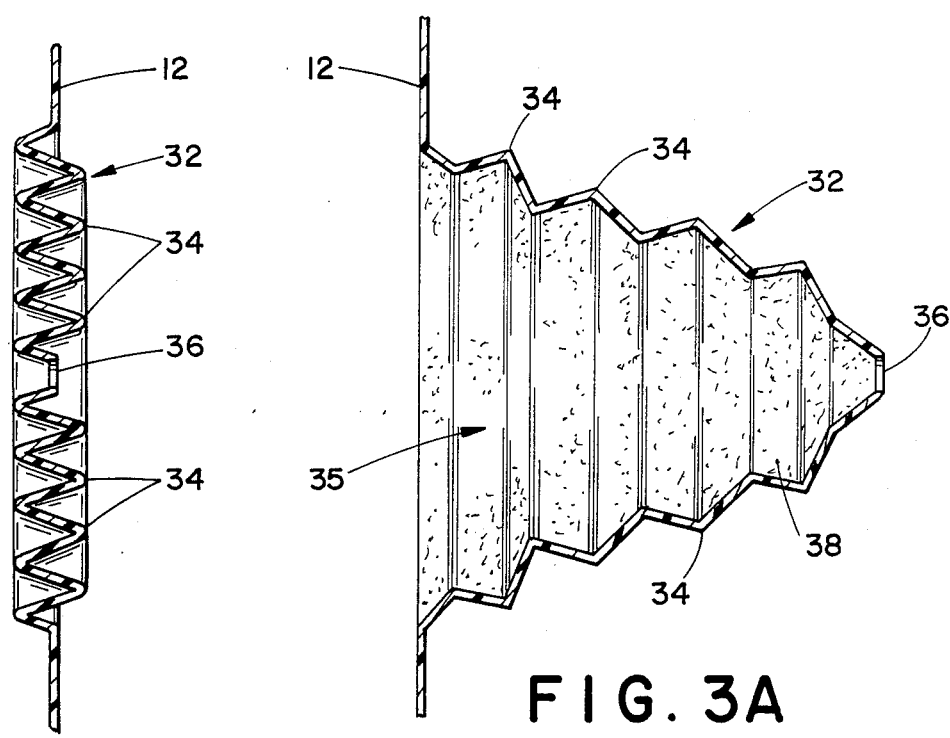
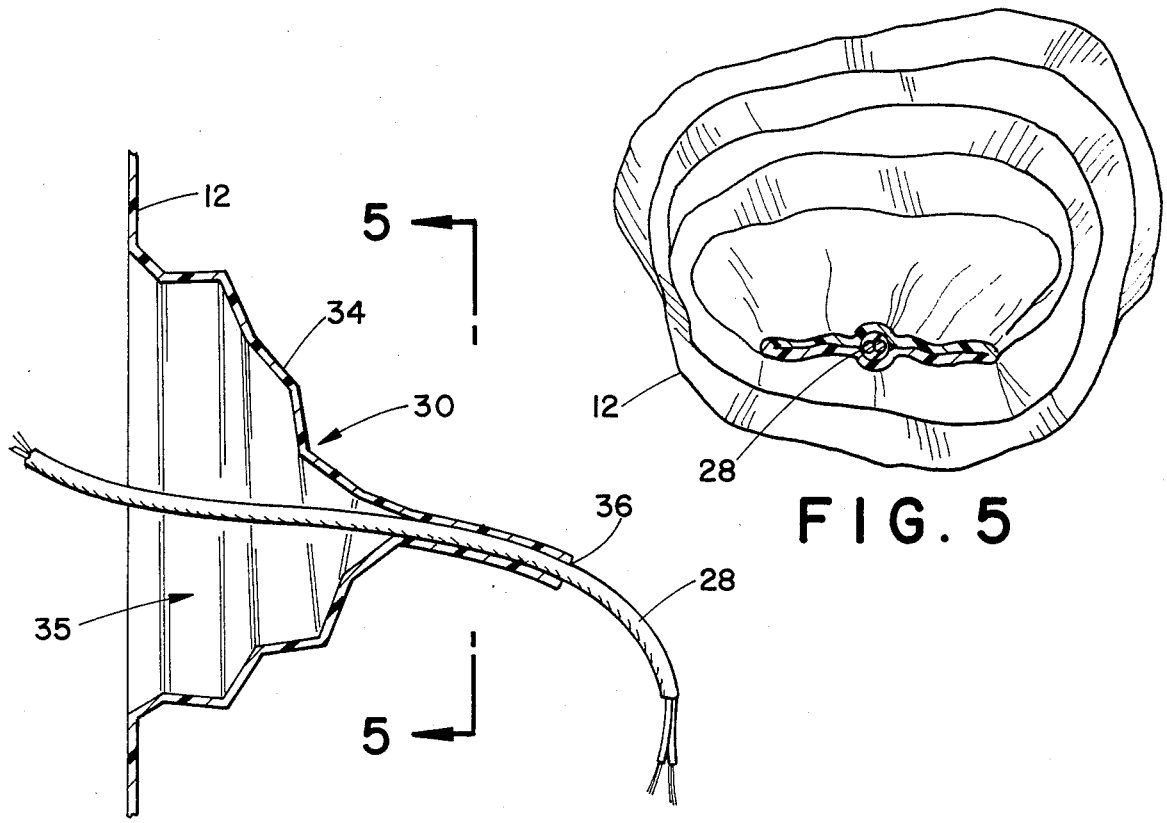

WATER DEFLECTOR WITH WIRE HARNESS SEAL

BACKGROUND OF THE INVENTION

The subject invention is directed to the art of shields or deflectors and, more particularly, to water and dust deflectors for application to vehicle panels. The invention is especially suited for use as a deflector for the inner panels of vehicle doors and will be described with reference thereto; however, as will become apparent, the invention could equally well be used as a shield or protector for a variety of vehicle body panels.

In the commonly assigned prior U.S. Pat. Nos. 4,588,627, 4,604,302, 4,420,520, 4,469,732, and 4,696,848, there are disclosed surface protectors or deflectors which are particularly suited for shielding the inner panels of vehicles against the infiltration of water or dust. In general, the deflectors comprise thin, flexible sheets of plastic material having a peripheral shape to overlie a predetermined portion of the inner door panel. Typically, the deflectors are joined to the panels by pressure sensitive adhesive applied in strips adjacent the peripheral edges of the deflectors.

In certain vehicles, for example those having power windows or mirrors, it is sometimes necessary for electrical wires, harness, or controls to pass through the deflector. In the past, access for this purpose has been provided by simple slits cut through the deflectors. This, of course, provides possible entry pathways for noise, dust and water. While some manufacturers have sealed plastic film flaps over the slits to at least help shed water, the problem of sealing such entry points has remained.

BRIEF SUMMARY OF THE INVENTION

The subject invention overcomes the noted problem and provides a deflector or water shield construction and method of using the same which allows sealing of the wire entry or passage points quickly and economically.

In accordance with one aspect of the invention, there is provided a water deflector article for application to a panel in covering relationship to an opening therein while simultaneously permitting a wire or the like to extend in sealed relationship through the deflector. The deflector of the invention comprises a thin flexible sheet of water impervious plastic material having a peripheral shape adapted to overlie a predetermined area of the panel. A laterally extending pocket forming section is carried by the sheet at a predetermined location corresponding to the location through which the wire or the like must extend. An opening extends through generally the bottom of the pocket forming section and adhesive means is provided in the interior of the pocket for sealingly adhering the interior of the pocket to the exterior of a wire or the like passing through the pocket and the opening.

Preferably, and in accordance with a more limited aspect of the invention, the pocket forming section is integral with the remainder of the sheet and the pocket has a deep, narrow, generally conical configuration.

In accordance with another aspect of the invention, a method is provided for forming a seal about an electrical wire or the like passing through a thin plastic water deflector sheet. The method contemplates forming a relatively deep, laterally extending pocket in the sheet at point where the wire or the like must pass. An opening is formed through the pocket generally at the inner end thereof. Subsequently, the wire or the like is passed through the opening and the inner surface of the pocket is sealingly adhered to the outer surface of the wire.

Preferably, the inner surface of the pocket is coated with a pressure sensitive adhesive and the interior of the pocket is compressed into engagement with itself and the exterior surface of the wire or the like.

As is apparent from the foregoing, the primary object of the invention is the provision of a water deflector article and method which facilitates sealing about wires, cables and the like which must pass through the deflector.

A further object is the provision of a deflector article which incorporates a sealable passage for electrical control wires and the like.

Another object is the provision of a deflector or water shield of the general type described which is inexpensive to manufacture and simple to use.

The above and other objects and advantages will become apparent from the following description when read in conjunction with the accompanying drawings wherein:

BRIEF DESCRIPTION OF THE DRAWINGS

FIG. 3 is a cross-sectional view taken on line 3—3 of FIG. 1;

FIG. 3A is a cross-sectional view like FIG. 3 but showing the pocket forming section in its expanded position;

FIG. 4 is a cross-sectional view taken on line 4—4 of FIG. 2 and showing in detail the electrical wire or cable passing through the deflector sheet; and FIG. 5 is a cross-sectional view taken on line 5—5 of FIG. 4.

Referring more particularly to the drawings wherein the showings are for the purpose of illustrating a preferred embodiment of the invention only and not for the purpose of limiting same, FIG. 1 shows in plan view the overall arrangement and construction of a deflector article formed in accordance with the subject invention and adapted to be received on the inner panel of a vehicle door assembly. Broadly, the deflector article 10 comprises a relatively flat, thin and flexible sheet 12 formed of a suitable plastic. Many different types of plastics have been used for forming such deflector sheets; however, polyethylene is particularly suitable for the purpose of the subject invention As shown, the periphery of the sheet 12 has a configuration sized and shaped to overlie a predetermined area of the inner door panel 14 (see FIG. 2). In order to permit the deflector to be suitably mounted to the door panel, it is preferably provided with pressure sensitive adhesive 16 along the side edges 18, 20 and the bottom edge 22 Additionally, a plurality of individual spots or rectangles of pressure sensitive adhesive are applied to the sheet at locations 24. The construction and arrangement of the subject deflector as thus far described is more fully shown and described in commonly assigned U.S. Pat. No. 4,588,627 the disclosure of which is incorporated herein by reference.

Figure 1:
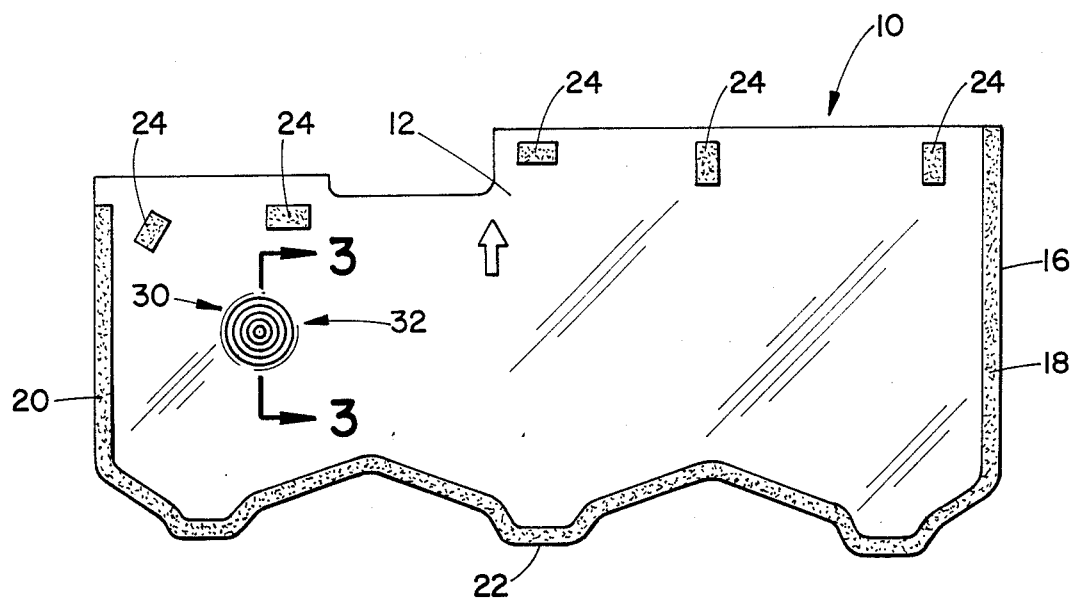
FIG. 1 is a plan view of a surface protector or water deflector article formed in accordance with the preferred embodiment of the invention.
Figure 2:
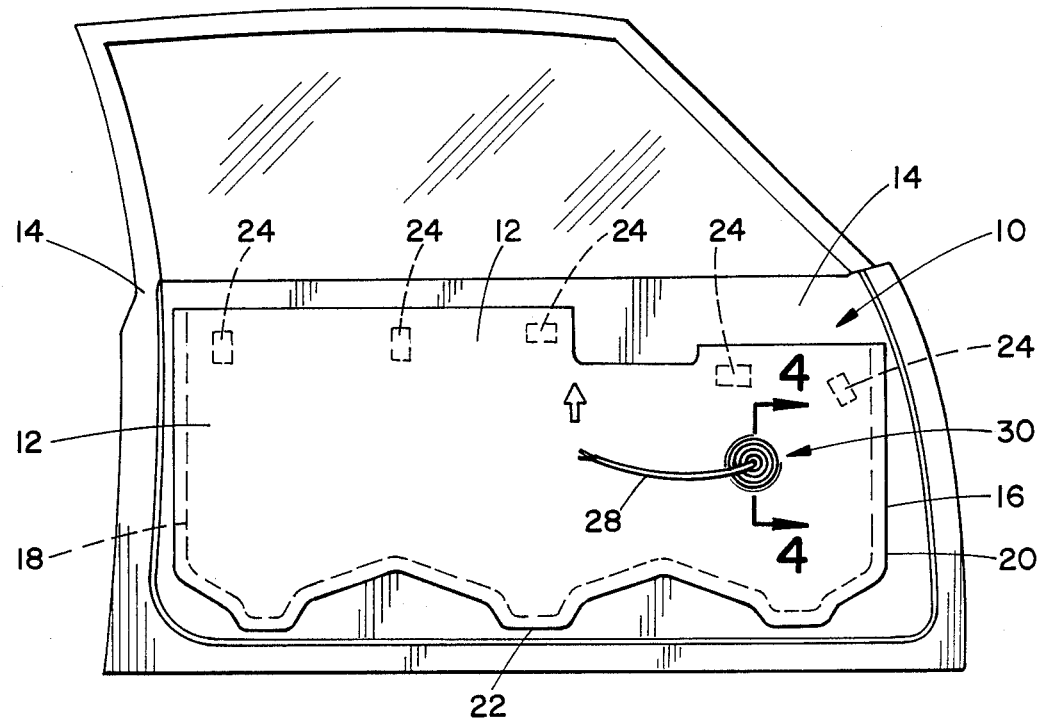
FIG. 2 is an elevational view of a door inner liner panel with the protector o deflector article of FIG. 1 applied thereto.

As discussed earlier, in certain environments it is desirable to have electrical wires, control cables, and the like pass through the deflector so that electrical power or control signals can be provided to door mounted devices such as power windows and power mirrors. The subject invention provides an especially desirable structure and method for sealing about such wires, cables, or the like. In particular, as shown in FIG. 2, an electrical control wire 28 must pass through the deflector at the location indicated generally as 30. According to the subject invention, in order to provide a seal about the control wire 28, the deflector article 10 is provided with a pocket forming section 32 best illustrated in FIGS. 3 and 3A. Specifically, the pocket forming section 32 is formed in area 30 and includes a plurality of closely spaced corrugations 34. The corrugations 34 are preferably formed about the location 30 and have a close spacing and relatively short height to lie substantially in the plane of the sheet 12 as shown in FIG. 3. The preferred method of forming pockets or bulges in such sheets is described more fully in U.S. Pat. No. 4,696,848 which is incorporated herein by reference. As is apparent, the suitable corrugations can be formed either by conventional thermoforming techniques or through the use of mechanical dies as described and claimed in commonly assigned co-pending Application Ser. No. 152,999, filed Feb. 3, 1988 for "Method of Forming a Surface Protector With An Expansible Pocket".

FIG. 3A shows the pocket forming section 32 deflected to its extended pocket forming position. Note that the pocket has a relatively deep conical configuration which is preferred for the subject purposes. In addition, an opening 36 is formed generally through the bottom of the pocket 35. Also, the interior of the pocket is preferably coated with a suitable pressure sensitive adhesive 38. This adhesive can be applied either before or after the corrugating is performed depending upon the method used for forming the corrugations. In addition, it should be appreciated from the following description that other types of adhesives could be used and they could be applied either prior to use of the deflector or simultaneously with its installation.

To use the article thus far described the pocket forming section 32 is expanded to the position shown in FIG. 3A and the control wire or the like 28 is passed through the opening 36. Thereafter, the end portion of the pocket 35 is compressed into engagement with itself and with the exterior of the wire 28 as shown in FIG. 4. The pressure sensitive adhesive sealingly bonds the various surfaces of the interior of the pocket 35 to itself and to the exterior of the wire or cable 28. This provides a fluid and dust tight seal about the wire or cable 28.

Although the method has been described with reference to its use with a pocket formed by the noted corrugation technique, it should be appreciated that the extended pocket section could be formed by a simple thermoforming operation to produce a permanent non-corrugated type of pocket and the subject invention contemplates the use of that type of pocket. Additionally, while it is preferred that the pocket forming section be integral with the remainder of the deflector sheet, it is, of course, possible to form the pocket in a separate piece of material which; is subsequently bonded or joined to the sheet in area 30.

As can be appreciated, the subject invention provides a simple and easy used article and method for sealing about cables and wires or the like passing through the deflector. Obviously, modifications and alterations of the preferred embodiment described above will occur to others upon a reading and understanding of the subject specification. It is my intention to include all such modifications and alterations as part of my invention insofar as they come within the scope of the appended claims.

What is claimed is:

1. A method of forming a seal about an electrical wire passing through a thin plastic water deflector sheet comprising the steps of:
    (a) forming a laterally extending pocket in said sheet at the predetermined point where said wire must pass through said sheet;
    (b) forming an opening through said pocket generally at the inner end of said pocket;
    (c) passing said wire through said opening; and,
    (d) adhering the inner surface of said pocket to the exterior of said wire.

2. The method as defined in claim 1 wherein said inner surface of said pocket is adhered to the exterior of said wire by pressure sensitive adhesive applied to the inner surface of said pocket.

3. The method as defined in claim 2 wherein said pressure sensitive adhesive is applied to said inner surface of said pocket prior to passing said wire through said opening.

4. The method as defined in claim 1 wherein said laterally extending pocket has its interior surface coated with an adhesive prior to passing said wire through said opening.

5. The method as defined in claim 1 wherein said pocket is formed by forming a series of corrugations about said predetermined point and deflecting said point laterally.

6. The method as defined in claim 1 wherein said pocket is formed integrally with the material of said sheet.

7. A protective deflector for application to a vehicle panel to prevent water or dust from entering the vehicle body while permitting a wire or the like to extend through said deflector comprising:
    a flexible sheet of plastic material having a peripheral shape generally matching the peripheral configuration of at least some portion of a vehicle panel;
    a laterally extending pocket in said sheet at a predetermined point corresponding to the point through which it is desired to extend said wire o the like;
    a hole formed generally at the bottom of said pocket; and,
    the interior of said pocket having adhesive therein for adhering the interior of said pocket to said wire o the like passed therethrough.

8. The protective deflector as defined in claim 7 wherein said pocket is formed as an integral portion of said sheet.

9. The protective deflector as defined in claim 7 wherein said adhesive is a pressure sensitive adhesive applied to the interior surface of said pocket.

10. The protective deflector as defined in claim 7 wherein said pocket is formed by a plurality of closely spaced corrugations located around said predetermined point.

11. A water deflector article for application to a panel in covering relationship to an opening therein, while permitting a wire or the like to extend in sealed relationship through said deflector comprising:

a thin flexible sheet of water impervious material having a peripheral shape adapted to overlie a predetermined area of the panel;

a laterally extending pocket forming section in said sheet at a predetermined location corresponding to the location through which said wire or the like must extend;

an opening formed generally through the bottom portion of said pocket; and an adhesive means in the interior of said pocket for sealingly adhering the interior of said pocket to the exterior of a wire or the like passing through said pocket and said opening.

12. The Water deflector article as defined in claim 11 including adhesive located along peripheral portions of said sheet for joining said sheet to said panel.

13. The water deflector article as defined in claim 11 wherein said pocket forming section is an integral portion of said sheet and comprises a plurality of corrugations encircling said predetermined location.

14. The water deflector article as defined in claim 11 wherein said pocket forming section has a deep conical configuration.

* * * * *